United States Patent [19]
Lee et al.

[11] Patent Number: 6,108,691
[45] Date of Patent: *Aug. 22, 2000

[54] DIRECTORY WITH OPTIONS FOR ACCESS TO AND DISPLAY OF EMAIL ADDRESSES

[75] Inventors: Eugene H. Lee, Cambridge; Michael Adler, Natick, both of Mass.; Lisa A. Dalton, Johnston, R.I.; David A. Wright, Sudbury, Mass.

[73] Assignee: Switchboard, Inc., Westboro, Mass.

[*] Notice: This patent is subject to a terminal disclaimer.

[21] Appl. No.: 09/062,098

[22] Filed: Apr. 17, 1998

Related U.S. Application Data

[63] Continuation of application No. 08/643,727, May 6, 1996, Pat. No. 5,742,769.

[51] Int. Cl.[7] ................................................ G06F 13/00
[52] U.S. Cl. ........................ 709/206; 709/219; 709/313
[58] Field of Search .................................. 709/202, 203, 709/204, 206, 217, 218, 219, 223, 225, 313, 3, 9, 10, 100, 102, 104

[56] References Cited

U.S. PATENT DOCUMENTS

| | | | |
|---|---|---|---|
| 5,493,564 | 2/1996 | Mullan | 370/351 |
| 5,555,426 | 9/1996 | Johnson et al. | 395/200.36 |
| 5,564,018 | 10/1996 | Flores et al. | 395/200.36 |
| 5,581,757 | 12/1996 | Maxey | 395/610 |
| 5,588,009 | 12/1996 | Will | 371/33 |
| 5,619,648 | 4/1997 | Canale et al. | 395/200.36 |
| 5,632,018 | 5/1997 | Otori | 395/200.3 |

FOREIGN PATENT DOCUMENTS

| | | |
|---|---|---|
| 02180815 | 3/1992 | Japan . |
| 05137277 | 12/1994 | Japan . |
| 05324492 | 7/1995 | Japan . |

OTHER PUBLICATIONS

Wingfield, N., "Bigfoot gives users a toehold in email" in CNET News. com, Apr. 26, 1996, http:/www.news.com/News/Item/0,4,1191,00.html.

"cc: Mail Directory Services User's Manual Version 1.0", Mountain View, Calif.: 1991, pp. 6–11, 21–31.

Easlick, R. and Chellis, J., "MCSE: Exchange 5 Study Guide", Alameda, Calif., 1997, pp. 136–158, ISBN: 0–7821–1967–0.

Notess, Greg R., "Email Address Databases," *Database*, vol. 19, No. 5, Oct.–Nov. 1996, pp. 85–89.

*Primary Examiner*—Viet D. Vu
*Attorney, Agent, or Firm*—Hale and Dorr LLP

[57] ABSTRACT

A directory service allows a user to receive email messages from senders without requiring the user to reveal his/her email address. The directory service maintains users' email addresses but allows users to restrict the display of their email addresses. The directory service can cause a message to be sent from a sender to a recipient without revealing the recipient's email address.

20 Claims, 8 Drawing Sheets

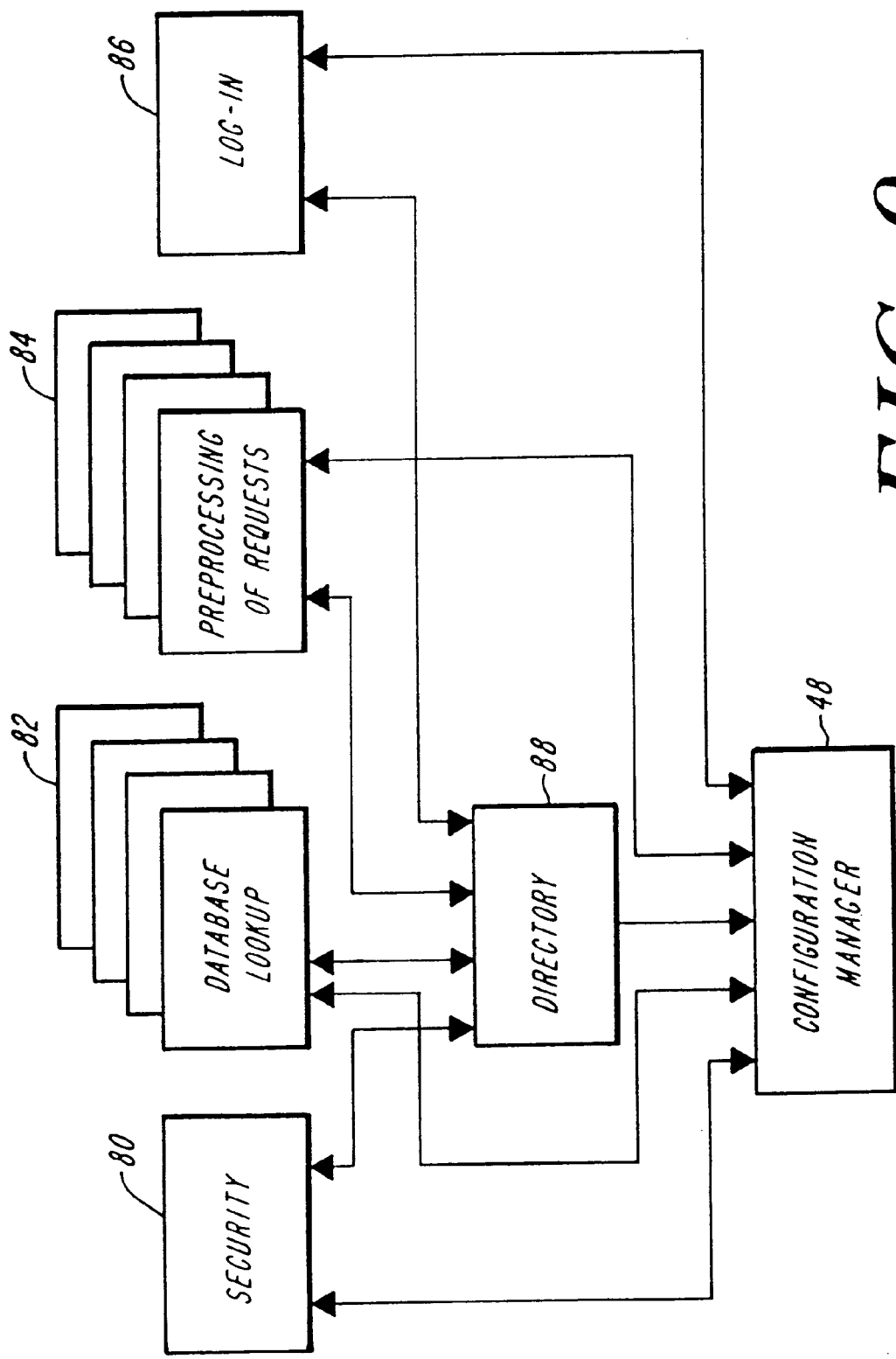

DIRECTORY WITH OPTIONS FOR ACCESS TO AND DISPLAY OF EMAIL ADDRESSES

CROSS-REFERENCE TO RELATED APPLICATION

This application is a continuation of application Ser. No. 08/643,727, filed May 6, 1996 now U.S. Pat. No. 5,742,769, which is expressly incorporated by reference for all purposes.

FIELD OF THE INVENTION

This invention relates to an on-line directory of information including electronic mail (email) addresses.

BACKGROUND OF THE INVENTION

Many organizations, including commercial on-line information services and corporate networks, maintain directories of users that can be accessed by other users. In a corporate network, a user may access the directory by looking up a name or an extension number; and in a directory for a commercial service, a user may use a name or a name with other information to obtain records.

With such on-line directories, a user who is searching for information about another user can enter a request that has a name and, in some directories, other keywords, such as a city, profession, or hobby. In response, the directory provides one or more records of users that match the request. These records may have certain minimum required information, or may have other information that other users choose to provide.

If a user wants to send an email message to an intended recipient, the user may be able to get the recipient's email address from such a directory. The user can then compose and send an email message to the recipient. If the email address is not provided to the directory by the user, or if the directory does not have such a field, the user cannot obtain the email address. If email addresses are provided to and then by the directory, users risk receiving unwanted email and having their email addresses sent to others.

OBJECTS AND SUMMARY OF THE INVENTION

It is an object of the present invention to provide a system and method that allows a user to receive an email message from a sender without providing the user's email address to the sender.

It is another object of the present invention to allow a user to be accessible through his/her email address while allowing the user to retain some privacy in the address.

The present invention features a system and method for allowing a user listed with a directory service to restrict display of his/her email address to others, while still allowing a sender to send a message to the user without revealing the user's email address to the sender. The directory service has storage for maintaining records in a database, and a processor for communicating with users and for accessing the storage. The directory service provides a number of options from which a user can select for display of the user's listing and email address. With one of the options, the processor displays a listing without an email address, but still receives messages from a sender and can send these messages to the recipient user without revealing that user's email address to the sender. Other options preferably include an option to display listings and email addresses, and an option to not display listings and email addresses.

The present invention allows a user to restrict access to his/her email address so that the user can screen unwanted solicitations. The system can also limit such messages to a certain length, such as 512 bytes, so that the user does not have to read lengthy junk email. Other features and advantages will become apparent from the following detailed description, drawings, and claims.

BRIEF DESCRIPTION OF THE DRAWINGS

FIG. 9 is a functional block diagram of a configuration manager with applications.

DETAILED DESCRIPTION

Figure 1:
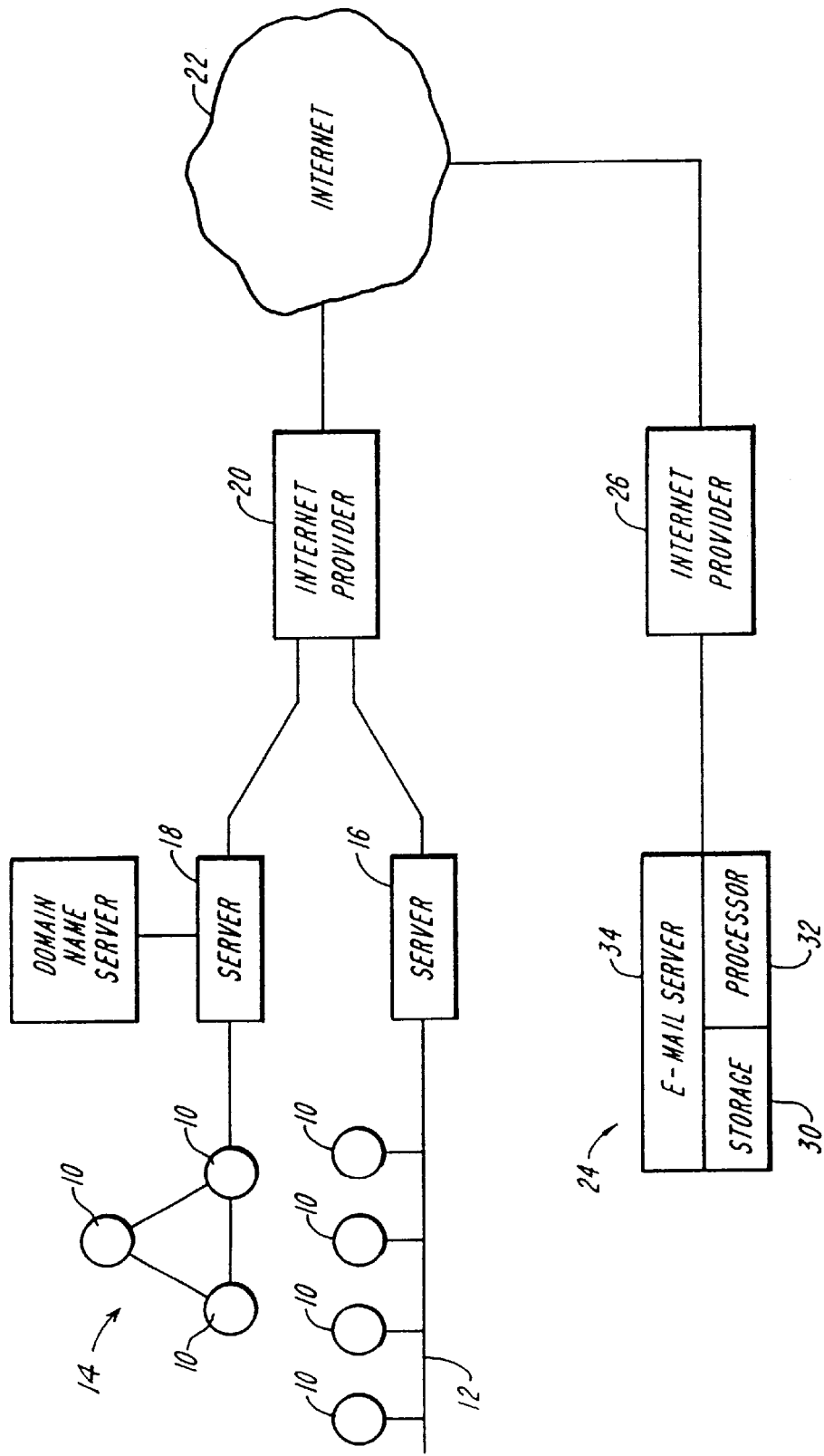
FIG. 1 is a block diagram of a directory service within a network.

Referring to FIG. 1, individual users 10 can be connected together through one of a number of different types of networks, including local area networks (LANs), such as an Ethernet LAN 12 or a token ring 14, or regional networks accessed over telephone lines, such as commercial information services. LANs 12, 14 have respective servers 16, 18 that are connected to an Internet provider 20, such as BBN Inc. of Cambridge, Mass., which provides access to the Internet 22 for many servers.

To obtain directory information about a very large number of people and businesses, a user can access a directory service 24, such as the SWITCHBOARD directory service (SWITCHBOARD is a trademark of Banyan Systems, Inc.). Service 24 is located on the world-wide web and is generally publicly accessible with a HyperText Transfer Protocol (HTTP) request from any user with a commercially available web browser.

In a preferred embodiment, directory service 24 has a very large number of "white pages" records that are publicly accessible at a web site over the Internet. In the Switchboard directory service, for example, there are currently about 93 million such white pages records. These records have basic directory information, i.e., names, addresses, and telephone numbers, for many individuals and businesses. The records are preferably compiled from sources such as telephone records, and are preferably updated periodically, e.g., annually.

Figure 2:
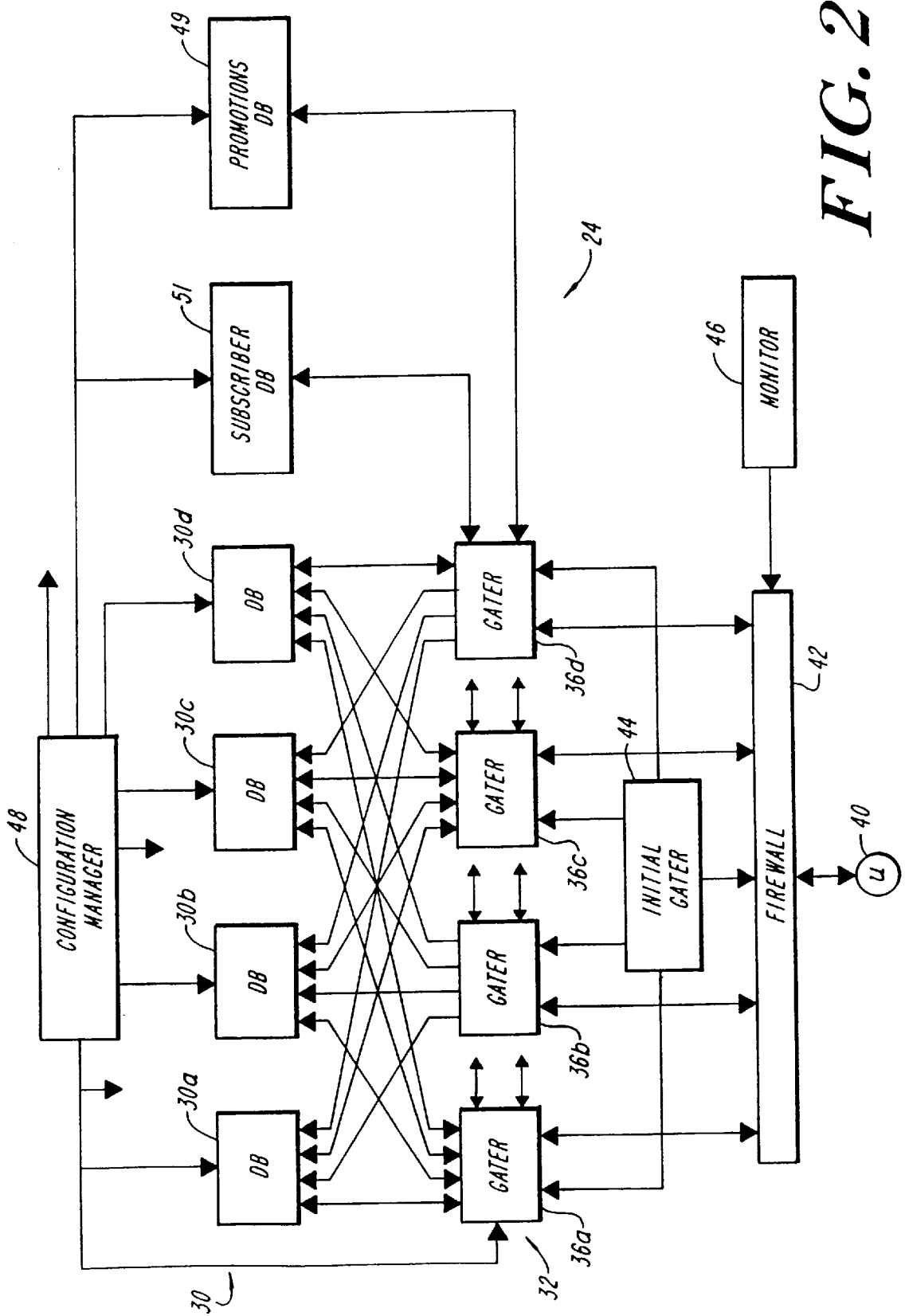
FIG. 2 is a functional block diagram of a database service.

Referring also to FIG. 2, directory service 24 has storage 30 and a processing system 32. Storage 30, which can be resident, remote, or a combination or resident and remote storage, has a number of databases of directory information. Preferably, storage 30 has a number of separately accessible databases 30*a*–30*d*, each of which is preferably a model CIndex, available from Trio, Inc., and each of which stores the same large number of records. Storage 30 can also have other databases that hold other types of information or serve other dedicated purposes.

Processing system 32 has a number of computers, termed "gaters" 36*a*–36*d*, each of which is preferably a PENTIUM®-based personal computer running on a 32-bit operating system such as Windows NT (PENTIUM is a registered trademark of Intel Corp., and Windows NT is a trademark of Microsoft Corp.). Each gater 36*a*–36*d* is linked to each database 30a–30d directly or through an intermediate switching network. While four gaters and databases are shown in FIG. 2, more or fewer of either or both can be used, and an equal number is not required.

Figure 3:
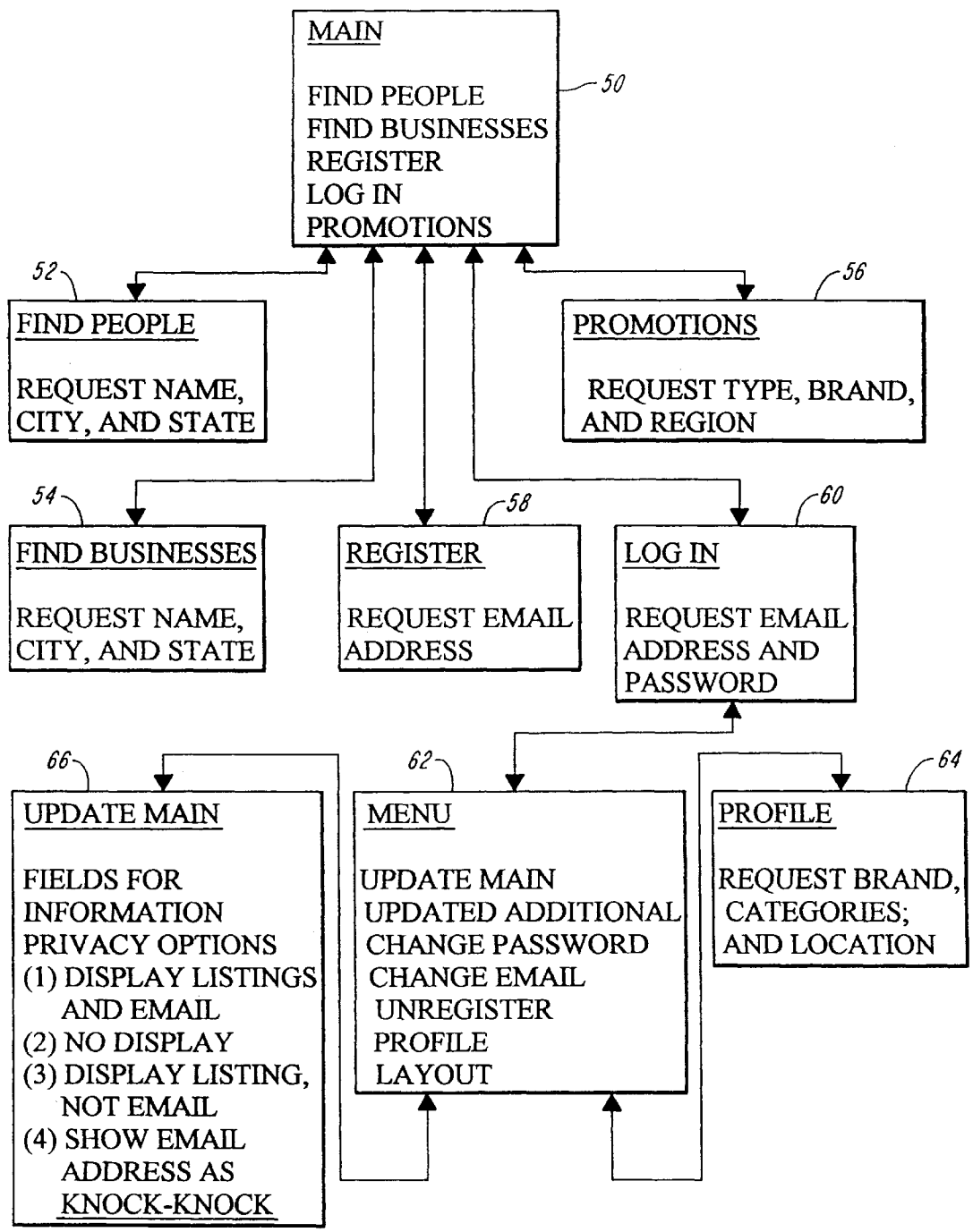
FIG. 3 is a chart of menus and input screens.

A user accesses directory service 24 over the Internet and through a firewall 42 that protects service 24 from external tampering. Referring also to FIG. 3, when the user accesses service 24 through a standard URL identifier, processing system 32 provides to the user a main menu 50 that preferably has at least the following items: find people, find businesses, register, log-in, and promotions. These items can be selected with a keyboard, or more typically with a pointing device, such as a mouse or trackball.

Figure 4:
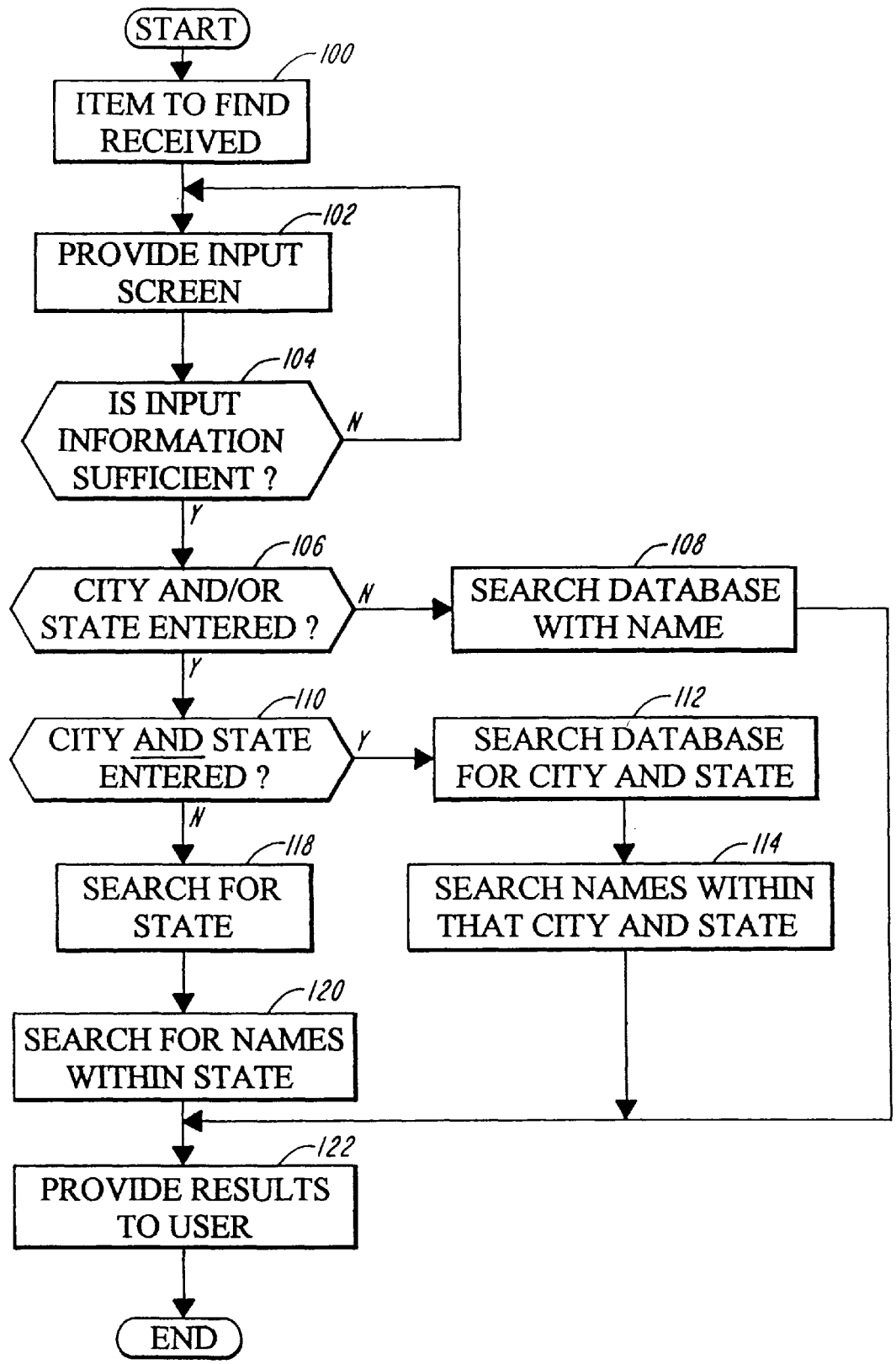
FIGS. 4–6 are flow charts illustrating methods for finding people or businesses, accessing promotions, and registering, respectively.

Referring also to FIG. 4, when the user selects the menu item to item find people or find businesses (step 100), processing system 32 provides an input screen 52 or 54 (as the case may be) with fields for the user to enter the name of an individual or business, and a desired city and state (step 102). The user enters and transmits this information to processing system 32. Processing system 32 determines whether the entered information is sufficient (step 104); if it is, the processor then determines whether a name only, or a name with city and/or state information was entered (step 106). If city and/or state are not entered and therefore only a name is entered (step 106), the database is searched by name (step 108). If it is determined that city and state information are entered (step 110), the database is searched first by city/state (step 112) and then by name (step 114). The other option is that a name and a state were entered (step 116), in which case the database is searched first by state (step 118) and then by name (step 120).

After the database is searched, records are provided to the user (step 122). These records are preferably provided as they are retrieved to speed up response time; alternatively, records can be accumulated and then provided together in a list in the order found, or they can be sorted, e.g., by middle initial or by city and state. Because there is typically only a small amount of information for each record, the entire name, address, and phone number is provided for each record, although the names could be provided in a list with only a city and state, in which case the user opens the record further to obtain complete information.

Accordingly, through a web site that is publicly accessible over the Internet, a user can access a very large number of directory records in storage 30 to look up a particular address or phone number. Such access is provided without requiring any ongoing relationship between the user and the service. A user can thus search records on a one time basis or many times if desired.

Referring again to FIG. 2, with this overview of how a search is performed, the operation and components of storage 30 and processing system 32 are described in more detail. When user 40 first accesses service 24, the user communicates with a web server and initial gater 44. Gater 44 provides a main menu 50 with a number of selections. When the user makes a selection from main menu 50 (FIG. 3), gater 44 passes the selection to one of gaters 36a–36d. The decision of which gater to pass to is based on the load of all gaters 30a–30d; alternatively the initial gater could use a round-robin method for determining the gater to which the selection should be routed. Once the selection is passed to another gater, such as gater 36b used here as an example, initial gater 44 does not have further interaction with the user for this request; rather, gater 36b thereafter communicates directly with the user through firewall 42.

Gater 36b (and each of the other gaters) has a preprocessing application that processes the selection. This application determines the type of request that is being made, e.g., if the request is a request to find people or businesses, whether the entered information is sufficient, and whether one of the other options discussed below has been selected. If the selected menu item is for finding people or businesses, the preprocessing application in gater 36b determines which of databases 30a–30d to access. The determination is preferably made in a round-robin manner; alternatively, the gater could use a load-based determination for the databases to make this decision. Each of the databases has a lookup application that causes the database to look up records in a manner as described above in conjunction with FIG. 4, i.e., by city and/or state first if such information is provided, and then by name.

To operate as described above, the preprocessing applications in the gaters keep track of the databases that are operational and adapt to a temporary or permanent addition or removal of a database. This system of multiple gaters and databases thus has a high degree of redundancy in that each database 30a–30d stores the entire set of records, and also has a high degree of extendability and flexibility because of the multiple gaters and databases.

Figure 5:
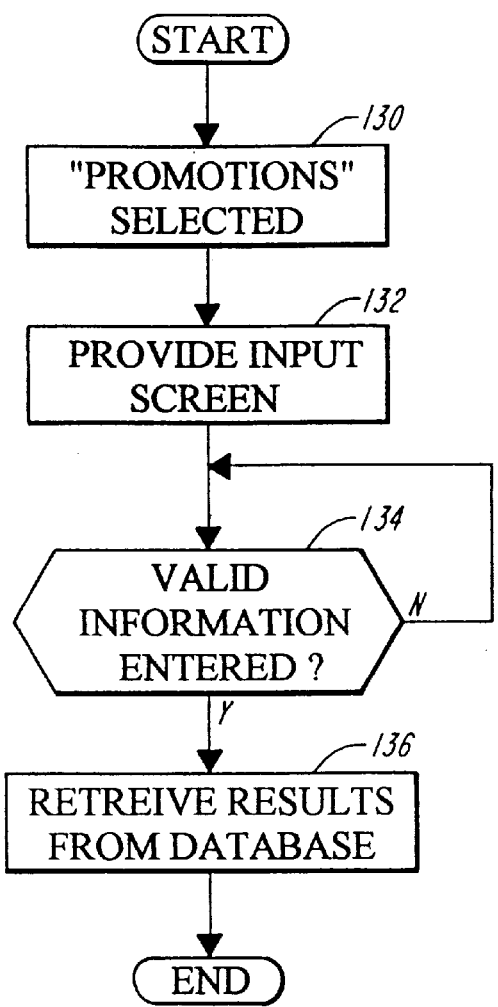

Referring to FIGS. 3 and 5, another option that a user can select from main menu 50 is "Promotions", which allows a user to obtain information and access to promotional information in a promotions database 49 (FIG. 1). When processing system 32 receives this selection (step 130), it responds by providing an input screen 56 that requests information on a type of product, service, or interest; a particular brand of that type; and a geographical location that can be based on different types of regions, such as city, state, portion of state, or zip code (step 132). In response to a valid input of information (step 134), processing system 32 accesses promotions database 49, and retrieves from database 49 entries that match the request (step 136).

Promotional information can be displayed in one of many different ways. The display can be just textual, or it can include graphical information. The information can also include HTML links to other Internet locations, such as to corporate home pages.

To ensure consistency in the design and organization of promotional information among multiple vendors, a template can be provided for a merchant to create promotional information for storage in promotions database 49. If there are multiple vendors for a product or service and the vendors want to use some or all promotional information in common, they can each use at least some of the same information, but with a unique address for each vendor. In such a case, a list of the names, addressees, and locations of a number of multiple vendors is stored. A template of promotional information can then be made. This template is then merged with the list of multiple vendors to provide multiple database records of similar promotional information with different vendors. For example, a rebate program by an automobile manufacturer could be included in promotional information for some or all dealers for that manufacturer. By request, users might only access dealers in the user's own geographical location.

This promotions service, like the service for finding people, is available to any user who can access the publicly accessible web site over the Internet; users do not need to be authenticated to use this service.

Directory service 24 also has a system of registration whereby registered users can log in to the directory service. If properly authenticated, these registered users are provided with additional services that are preferably not otherwise available to a user who accesses the web site without authentication.

Figure 6:
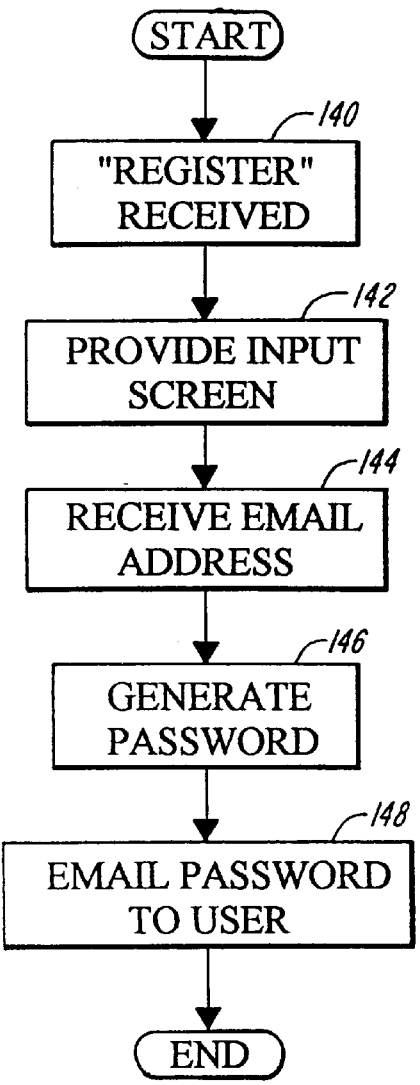

Referring again to FIGS. 3 and 6, for a user to register, the user selects the "Register" entry in main menu 50. In response to this selection (step 140), processing system 32 invokes a registration application. First, processing system 32 provides an input screen 58 with a field for requesting the user's email address (step 142). When processing system 32 receives the user-entered email address (step 144), it generates a password (step 146), and emails that password to the user with the entered email address (step 148). Password and email information associated with the registered user is stored in a subscriber database 51 (FIG. 2).

Referring to FIG. 3, once the user has a password, that user can then log in to the system by selecting the item "Log in" from main menu 50. In response to this selection, processing system 32 invokes a log-in application. According to this application, the processor provides an input screen 60 that requests the user's email address and password. These items of user-entered information are provided to a security application that authenticates the user-entered information based on the information stored in subscriber database 51.

If the user is properly authenticated, processing system 32 provides a menu 62 that has a number of options and further services for registered users. From menu 62, a user can perform a number of straightforward tasks, including change password, unregister, log out, and change email address. These items, which are generally self-explanatory, cause routines to be invoked to take care of the request, e.g., to change password, an input screen can provided to allow the user to enter twice (for verification) a proposed new password that can then replace the password stored in the subscriber database.

Menu 62 has a "Profile" selection, which allows a user to establish a profile of interests to obtain promotional information from the promotions database. When "Profile" is selected, processing system 32 invokes a profile application that causes the processing system to provide an input screen 64 that has fields for requesting type, brand, and location, the same categories discussed above for the "Promotions" feature. A user may provide a profile that includes a specific purchasing interest, such as an interest in purchasing a particular brand of automobile in a particular region, such as Eastern Massachusetts; the user may also express more general interests, such as interests in photography or skiing. This profile can either be stored in subscriber database 51, or stored in databases 30a–30d as an attribute of the record.

The processing system can search promotions database 49 with the profile. In a preferred embodiment, whenever the registered user logs in, processing system 32 searches promotions database 49 using the entered interests, retrieves available promotions, and provides them to the user automatically. This search is preferably performed automatically without being requested by the user. To protect the user's privacy, the promotions are preferably provided without revealing to the merchant or vendor the name of the user that received the promotional information. The promotions that have not previously been shown to the user are preferably highlighted; alternatively processing system 32 can filter out previously shown promotions and show only new promotions.

The system can provide a list of searchable "types" or interests that currently exist so that the user can select from one or more existing types. The user can also enter a type not previously entered and wait for some new promotion to match the type. At any time, a user can remove information from his/her profile so that such promotions are no longer retrieved, e.g., after the user has already made a specific purchased for which a profile entry was made. Indeed, the user need not even provide a profile at all, and thus the user can elect not to ever receive any promotional information.

Being registered is thus advantageous in that each time a certain event occurs, preferably whenever the user logs in, a search can be made automatically for promotions; as noted above, these promotions are preferably provided in a manner such that the organizations posting the promotions do not have automatic access to the users, although the users can respond to the promotion; the profile thus provide an option for the user to conveniently seek information, without the user being provided with unwanted advertising.

Referring again to FIG. 3, a registered user can make a selection "Update Main Listing" or "Update Additional Listing" from menu 62. These selections causes processing system 32 to provide an input screen 66 with fields for providing information. While the white pages directory may have entries that are unverified and entries that are out-of-date, a registered user can keep his/her information accurate and current.

The processing system also provides privacy options with checkboxes from which a user can select one of a number of options relating to the display of the user's main listing, additional listing, and/or email address(es) to others. As shown in input screen 66, under a first option, the user's listing and email address are displayed in a normal manner. This option may be a default, and a checkbox associated with this option may be prechecked. Three further options allow the user to restrict display of and access to the user's email address(es). Under a second option, the user's listing and email address, while stored in storage 30, are never shown to others and thus cannot be used by others through directory service 24. A sender who does not already know that user's email address cannot send mail to that other user (assuming the sender cannot guess the email address). Under a third option, the listing is shown, but the email address is not displayed.

A fourth option has a checkbox and the phase such as "Show Email Address as Knock-Knock," (with the phrase Knock-Knock underlined to indicating that the phrase is an HTML link) to indicate a different option. By clicking on that underlined phrase, the system retrieves and displays a help file that explains this feature. As will be described below, by selecting this option, the user's email address is not displayed, but a registered user can nonetheless use the directory service to send an email message to the intended recipient along with the sender's email address so that the recipient can respond if desired.

After the user completes editing his/her listing(s), including the email address(es), the edited record is stored in storage 30. The record includes the privacy option information, which is accessible to processing system 32.

Figure 7:
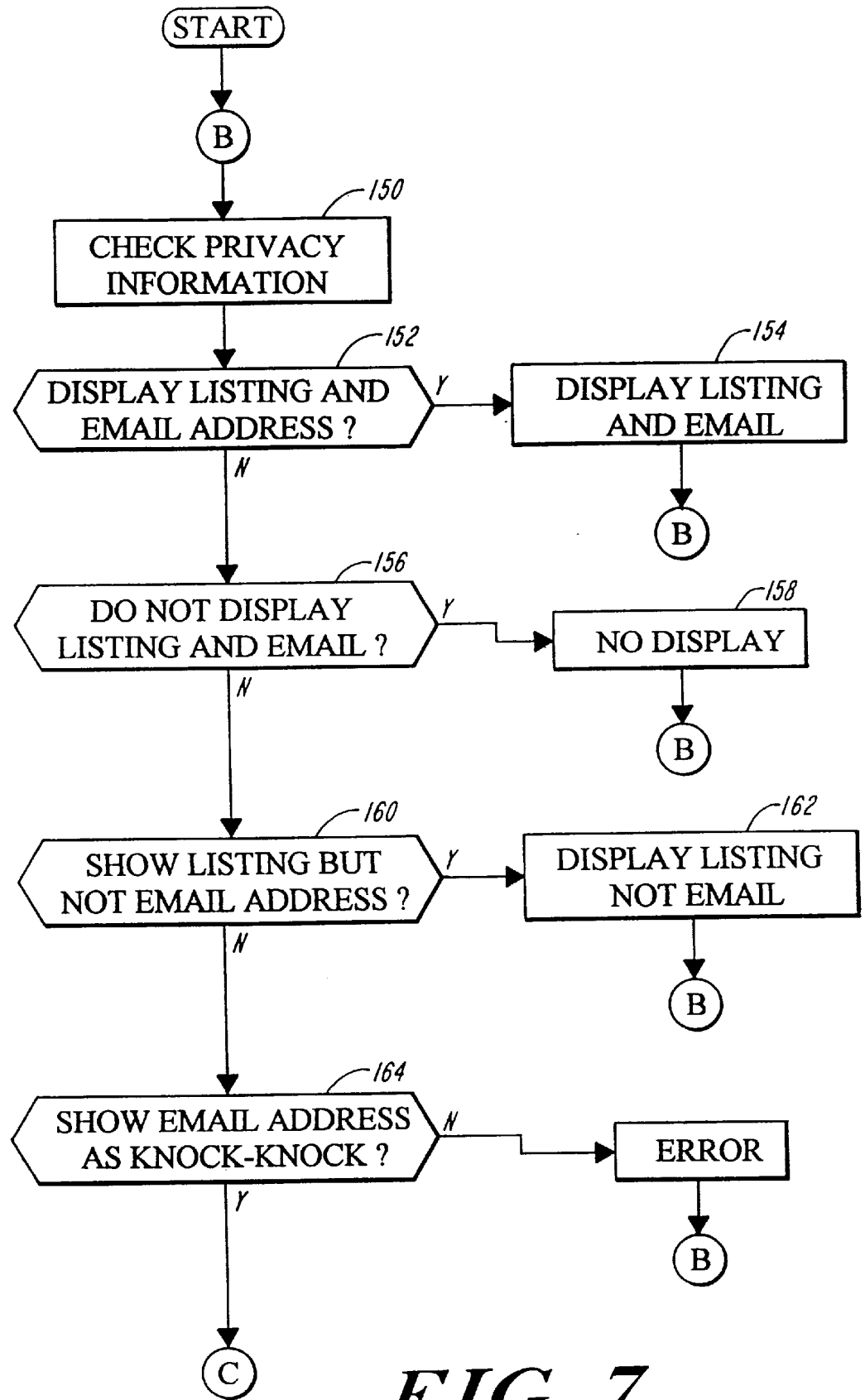
FIGS. 7 and 8 are flow charts illustrating methods for displaying records.
Figure 8:
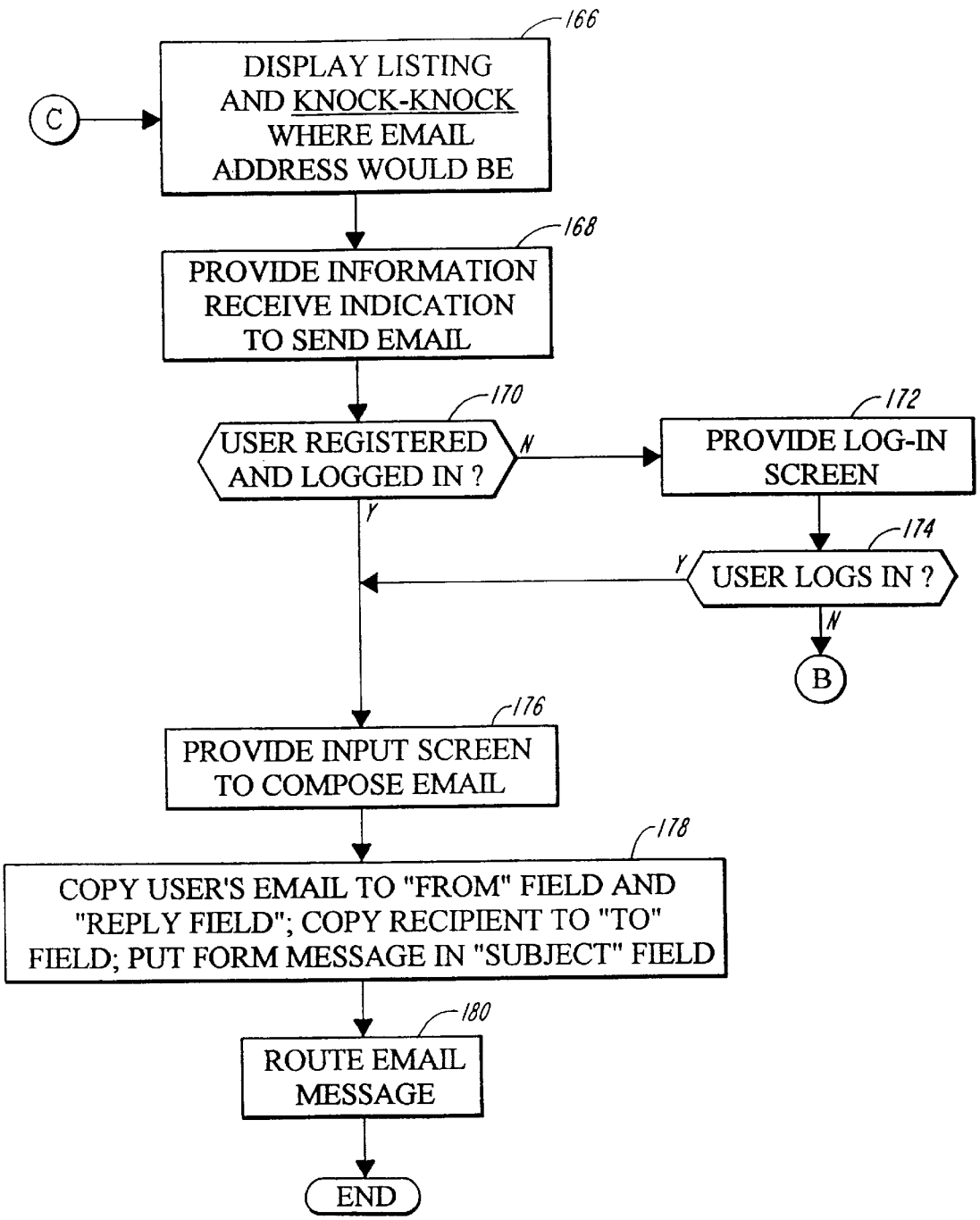

FIGS. 7–8 are flow charts of methods for providing information of users in response to a request to "Find People", i.e., at step 122 (FIG. 4). If a record of a non-registered user is retrieved, it is typically displayed with its basic information. If the record is for a registered user, processing system 32 checks the option information for the record (step 150). If this option information indicates that the option of displaying the listing and email address was selected (step 152), processing system 32 causes the record to be displayed (step 154). If processing system 32 determines from the option information that the user has selected the option not to display the listing or email address to others (step 156), the processing system will not display the record (step 158). If the privacy information indicates that the user selected the option to show the listing but not the email address (step 160), the processing system will display the listing but not the email address (step 162). When the email address is not displayed, it may simply be omitted, or it may have some notation, such as "unpublished," to indicate that it exists but is not shown.

If processing system 32 determines from the option information that the user has selected the feature to show the email address as "Knock-Knock" (step 164), processing system 32 causes the listing to be displayed with the underlined phrase "Knock-Knock" (or some other phrase) in the email address field (step 166). If processing system 32 receives an indication that the user has clicked on that phrase, processing system 32 retrieves and displays a file of information that explains aspects of this feature, i.e., that the user can attempt to send a message to recipient, but that the user cannot get the recipient's email address except from the recipient.

This file also includes an item that the sender can select in order to send email to that potential recipient user. If the sender enters and processing system 32 receives such an indication (step 168), processing system 32 checks whether the sender is logged in (step 170). If not, processing system 32 provides a log-in screen (step 172).

If the sender is already logged in or if the sender logs in with the screen provided in step 146 (step 174), a screen or window is provided with information that explains the feature for sending a message and provides an input screen to allow the user to compose a message (step 176). Preferably the length of this message is limited, e.g., to 512 bytes or to a specific number of characters.

Once an email message is composed, the sender indicates that it should be sent by selecting an item on the screen. The processing system receives the message and formats a message header as follows:

```
From:     <sender's email address>
To:       <actual recipient's email address>
Subject:  Requesting Email Address (relayed via Switchboard)
Reply-to: <sender's email address>
```

The processing system thus copies the recipient's email address (which was stored but not provided to the requesting user) into a "to" field; copies the sender's email address into a "from" field and a "reply-to" field; and puts into the "subject" field a phrase indicating that the source of the message is via this feature (step 178). In addition to this header, the processing system attaches an explanatory note for the recipient. Processing system 32 then causes the message to be routed to the recipient via a conventional email server 34 (step 180). The explanatory message to the recipient indicates that the sender is trying to communicate with the recipient; that the recipient should reply to the message only if the recipient wants to communicate with the sender; and that if the recipient replies, the recipient's actual email address is sent to the sender.

At this point, the tasks of processing system 32 are complete with respect to the sending of a message to this recipient. If the recipient responds to the sender by indicating "reply," a feature that is available through typical email services, the reply message is sent directly through Internet email channels, independent of the directory service. As is typical with email messages, this reply message will have a "from" field that shows the replying sender's email address, thus disclosing the email address. By not replying, the recipient can keep his/her email address secret from the sender. Accordingly, a user can review email messages and respond selectively, thus keeping his/her address private while still being accessible through the directory service.

Referring again to FIG. 3, from menu 62, a registered user can create and edit a main listing and/or an additional listing. The additional listing can be for a second residence, can include a mailing address that is different from a residential address (such as a P.O. Box), or a business address in addition to a residential address. Both the main listing and the additional listing(s) can have the privacy options associated with them independently. This means, for example, that a user can choose to have all information displayed for one or both listings, can have only business or only residential information displayed, or can display all of the business information and all of the home information except for the home email address. Accordingly, the registered user has significant flexibility in the various types of listings that can be made and in the information that is displayed to others.

The main listing and any additional listing are stored in the main database (preferably duplicated over multiple databases). When another user accesses the records that includes the record of a registered user, the main listing and/or additional listings could be displayed in full. Preferably, however, when lists of records are provided that match a request by a user, the information of registered users is provided in a summary form similar to the form for nonregistered users. Accordingly, the displayed record has name, address, and telephone number, but for registered users, the listing also has an email address if the registered user elected for it to be displayed, and an attribute called "More Info." When a user selects this attribute, further information associated with the registered user is displayed. This further information can include additional details and can include one or more additional listings. Preferably, however, the additional listings are treated as separate listings within the main database; consequently, one name could have several listings with different listings for different residences, mailing addresses, or separate listings for home and work.

When a user first registers and edits his or her main listing, the system requests that the user identify himself or herself against an entry in the main database. The user is allowed to move a cursor through the names to select his or her entry. The registered user is thus provided with the opportunity to edit one main listing in the database, but is not provided with access to make edits to any other entries in the database and thus is not given general access to the database. After the user edits the main listing, the new information is stored in the main database and displayed as noted above, while the old information is preferably stored in the subscriber database. If the user "unregisters", the "old" information stored in the subscriber database is returned to the main database. While this information may then be incorrect, it will likely be updated at some time in the future through routine large-scale updates to the database.

Referring again to FIG. 2, to ensure efficient operation of directory service 24, various monitoring functions are provided. Outside of firewall 42 (relative to the gaters and databases), a monitor 46 randomly generates requests of names to find people. The names of people are generated from a list of first names and a list of last names that are randomly combined to generate full names. Monitor 46 makes requests with these generated full names and awaits a response. When service 24 responds with records or with a message indicating that no matching records exist, the response is considered valid. If an error message is returned, or if no response is returned within a desired time, however, the monitor provides an alarm. This alarm preferably takes the form of a page via a paging system to an individual, such as a system manager, who oversees operations of the database. Monitor 46 can also generate requests to log in by using names with randomly generated passwords to ensure that a security application in the subscriber database is functioning properly.

Referring also to FIG. 9, directory service 24 also has a configuration manager 48 coupled to all of the databases and to the gaters for reconfiguring applications when changes are made to service 24. Configuration manager 48 is interconnected to applications that reside within the computers in processing system 32 and in the databases in storage 30. As shown in FIG. 9, these applications include, for example, security application 80, database lookup applications 82, preprocessing applications 84, and log-in application 86. The applications shown are illustrative; other applications also reside in the system, including the profile and registration applications noted above.

Each of applications 80–86 and configuration manager 48 are also connected to a directory 88 that maintains information concerning relationships between applications, and types of events that can affect the applications. Some applications affect the operation of others; for example, requests are passed from the preprocessing applications 84 in the gaters to lookup applications 82 in the databases. If one of the databases and hence its lookup application 82 is inoperative, e.g., due to intervention by the system manager or due to a malfunction, the preprocessing applications 84 must take this situation into account when passing a request to lookup applications 82. The preprocessing applications are designed to reconfigure under such situations, but such reconfiguration is preferably in response to control from configuration manager 48 because other applications could also be affected.

Another example of related applications is that log-in application 86 is related to security application 80. If a registered user tries to log in, the security application checks subscriber database 51 to make sure that the user is authorized and that the password is correct. If security application 80 malfunctions, however, log-in application function should be halted to keep unauthorized users out. Such a malfunction may be detected by the monitor discussed above.

Directory 88 maintains information that includes lists of applications, lists of other applications that are related to them, and the types of events that could affect each application. Configuration manager 48 is connected to each of the applications and monitors them for events, such as malfunctions or interventions by a system manager, e.g., for maintenance, addition, or removal of a database or a gater. For example, if one of the databases and hence its lookup application 82 is taken off line for maintenance, the configuration manager 48 detects this event. In response, it checks directory 88 and determines from directory 88 that the lookup applications are related to preprocessing applications 84. Configuration manager 48 therefore sends messages to the preprocessing applications 84 indicating this updated status of the lookup applications. This causes preprocessing applications 84 to reconfigure to select databases from among the remaining databases. In the case of round-robin selection of databases, this means that the available pool of databases for the preprocessing application to pass requests to is altered. This configuration management thus contributes to the systems flexibility, scalability, and adaptability.

Having described preferred embodiments of the present invention, it should be apparent that other modifications can be made without departing from the scope of the invention as set forth in the appended claims.

What is claimed is:

1. A method including:

maintaining a database of directory information in a directory service with records of individuals, including maintaining records of users who are registered with the directory service and records of users who are not registered with the directory service, wherein the records of registered users may include an electronic mail (email) address and the records of non-registered users do not including an email address;

providing to the registered user options for displaying an email address including options (i) to display the email address, (ii) to not display the email address and not forward messages, and (iii) to not display the email address but to forward messages;

when a searching user accesses information associated with a registered user who has elected option (iii), receiving from the searching user a message to be sent to the registered user, and sending the message to the registered user without providing the recipient's email address to the searching user.

2. The method of claim 1, wherein the sending includes:

copying the searching user's email address into a "from" field;

copying the recipient's email address into a "to" field in a way that is not visible to the searching user; and sending the message via an email server.

3. The method of claim 1, wherein the directory service is generally accessible to users with Internet access.

4. The method of claim 1, wherein the sending is performed only for searching users who are also registered users.

5. A directory service comprising:

means for maintaining records that include names, email addresses associated with the names, and information associated with the records indicating one of a number of display options for the email addresses;

means for receiving a request for records from a searching user and for accessing the maintaining means to retrieve records, the receiving and accessing means checking the information associated with the record to determine whether or not the email address of each retrieved record should be displayed to the user, and displaying or not displaying the email address in response to the information.

6. The directory service of claim 5, further comprising an email server for sending email messages to recipients.

7. The directory service of claim 5, the processor having means for receiving a message from a requester for a user whose email address is not displayed and for causing the message to be sent to the user without revealing to the requester the user's email address.

8. A method for use by a directory service that includes a database with records of users including the users' respective email addresses, and a processor for retrieving and providing records, the method comprising:

receiving over the Internet a request from a requester for records from a directory service;

accessing information associated with the record to determine whether or not the email address is to be displayed; and in response to a determination that the email address is not to be displayed, provide to the user a clickable option allowing email to be sent to users identified in records even if the information indicates that the email address is not to be displayed, receiving from the requester a request to utilize the option allowing email to be sent to users identified in records even if the information indicates that the email address is not to be displayed, receiving a message from the requester to be sent to the recipient, and sending the message to the recipient without providing the recipient's email address to the requester.

9. The method of claim 8, wherein the sending includes providing to the recipient the requester's email address.

10. A method including:

maintaining a database of directory information in a directory service with records of individuals, including maintaining email addresses;

receiving a request from a searching user for information about individuals having an entered name;

displaying for the searching user an individual with the entered name and a hypertext link for initiating a process to send a message to the individual without displaying the individual's email address;

providing the searching user with a field for sending a message to the individual in response to the searching user selecting the hypertext link;

receiving from the searching user a message to be sent to the individual; and sending the message to the individual, thereby providing the message to the individual without providing the individual's email address to the searching user.

11. The method of claim 10, wherein the sending includes:

copying the searching user's email address into a "from" field;

copying the individual's email address into a "to" field without displaying the individual's email address to the searching user; and sending the message via an email server.

12. The method of claim 10, wherein the directory service is generally accessible to users with Internet access.

13. The method of claim 12, wherein the service further includes and can display name and address information.

14. A method comprising:

a user accessing a directory service that includes a database with records of individuals, including the individuals' respective email addresses;

the user requesting records from the directory service;

the directory service providing to the user a clickable hypertext link to allow email to be sent to a recipient identified in records without displaying the email address, the user clicking the hypertext link;

the directory service providing an input screen for the user to send a message to the recipient; and the directory service sending the message to the recipient without providing the recipient's email address to the requester.

15. The method of claim 14, wherein the database service is generally accessible over the Internet.

16. The method of claim 14, wherein the database service further includes name and address information.

17. The method of claim 14, wherein the database service is capable of providing records of individuals with a given last name, and wherein those records can be limited by the user entering the name of a state.

18. The method of claim 7, wherein the message is sent directly to the user.

19. The method of claim 8, wherein the message is sent automatically to the recipient.

20. The method of claim 10, wherein the message is sent automatically to the recipient.

\* \* \* \* \*